United States Patent [19]
Kikuchi et al.
[11] Patent Number: 5,000,641
[45] Date of Patent: Mar. 19, 1991

[54] REFUSE CONVEYOR SYSTEM

[75] Inventors: Koshin Kikuchi; Shinichi Ozaki, both of Tokyo, Japan
[73] Assignee: Shimizu Construction Co., Ltd., Tokyo, Japan

[21] Appl. No.: 451,993
[22] Filed: Dec. 18, 1989
[30] Foreign Application Priority Data
Dec. 16, 1988 [JP] Japan ................................ 63-318227
[51] Int. Cl.5 .................................................. B65G 1/00
[52] U.S. Cl. ....................................... 414/21; 414/277; 414/660
[58] Field of Search ............... 414/277, 282, 417, 594, 414/608, 609, 611, 615, 659, 660, 661, 662, 668, 21

[56] References Cited
U.S. PATENT DOCUMENTS

| | | | |
|---|---|---|---|
| 2,639,050 | 5/1953 | Huffmann | 414/417 |
| 3,229,836 | 1/1966 | Koenig | 414/417 |
| 3,767,074 | 10/1973 | Sandefer . | |
| 3,851,778 | 12/1974 | Schurch | 414/609 |
| 4,690,611 | 9/1987 | Nobuhara | 414/661 |
| 4,804,307 | 2/1989 | Motoda | 414/609 X |

FOREIGN PATENT DOCUMENTS

| | | | |
|---|---|---|---|
| 0297145 | 6/1988 | European Pat. Off. . | |
| 0302113 | 6/1988 | European Pat. Off. . | |
| 69404 | 3/1989 | Japan | 414/404 |
| 69406 | 3/1989 | Japan | 414/422 |
| 486206 | 6/1938 | United Kingdom . | |
| 1398418 | 6/1975 | United Kingdom . | |

*Primary Examiner*—David A. Bucci
*Assistant Examiner*—Craig Slavin
*Attorney, Agent, or Firm*—Oblon, Spivak, McClelland, Maier & Neustadt

[57] ABSTRACT

A refuse conveyor system for a multi-floor building is disclosed, which includes: (a) a multi-floor building having a plurality of floors, (b) a vertical shaft defined by walls and extending through one or more floors of the multi-floor building, one of the walls having a window at portions corresponding to the respective floors of the multi-floor building, (c) a transport control system, (d) a refuse container for storing and conveying refuse, the refuse container having a closeable opening and a lid for closing the opening, (e) a compartment having a window on one side thereof and an opening on the top side thereof, the window facing and communicating with the window of the vertical shaft, (f) a weight sensor for checking the fullness of the refuse container with the refuse, (g) a transport mechanism for transporting the refuse container, the transport mechanism being operatively communicated with the transport control system, (h) a conveyor having a conveyor belt operatively communicated with the transport control system, and (i) a tank for storing the refuse, the tank being installed on the ground.

5 Claims, 2 Drawing Sheets

REFUSE CONVEYOR SYSTEM

BACKGROUND OF THE INVENTION

1. Field of the Invention

The present invention relates to a refuse conveyor system equipped in a medium- or high-rise building such as a multiple dwelling house or the like.

2. Discussion of the Background

Heretofore, refuse produced or discharged by residents of a building such as a multiple dwelling house, an apartment or the like in their daily life, has been treated in such a way that the refuse filled into plastic bags, plastic buckets or the like by each resident in the building, and the bags or the buckets are brought by each resident from each room to an established refuse accumulation area or site on the lowest floor or ground floor. For example, a resident brings one or more plastic bags which are filled with refuse in his both hands and gets on an elevator box or goes down stairs on foot to the established refuse accumulation area to dump them out on a predetermined refuse gathering day.

Further, an installation called "trash chute system" has also been employed which is provided in a building for conveying refuse. The trash chute system is of a vertically extending hole structure in which a trash chute defined by surrounding side walls extends vertically through a building, and has throwing openings in one of the side walls at respective floors through which openings residents can throw refuse.

When using the trash chute, residents put refuse in the home in a container such as a plastic bag, plastic or metal bucket or the like, bring the bag or the like container containing the refuse to the nearest opening and throw away the refuse into the trash chute, with the refuse contained in the bag or with the refuse being taken out of the bucket before throwing. The refuse falls down to the bottom of the chute at the lowest floor and is accumulated there. The accumulated refuse is taken out from the bottom portion of the chute at predetermined interval, e.g., once a day or twice a weak.

The conventional refuse transporting methods as described above have various problems. That is, in the former case, carrying the refuse to the accumulation site on foot is a time-consuming job for residents and bad smell is discharged from the refuse and hangs in the air on the way of carrying the refuse from each home to the accumulation site. Also, in the former case, comfortable or hygienic environment in the home is disrupted by the bad smell or the like discharged by the refuse which the residents are compelled to keep in the room in order to avoid dumping it in a public space such as the accumulation site on the day or days other than the specified gathering day(s). In the latter case, the refuse adheres to the inner walls of the trash chute and the adhering refuse gives off a bad smell in the air.

SUMMARY OF THE INVENTION

Accordingly, it is an object of the invention to provide a refuse conveyor system in a building such as a multiple dwelling house or the like, which is independent of the passenger elevator, and which can convey refuse containers between each floor and an established accumulation site with a reciprocating motion of means for conveying the containers.

Another object of the present invention is to provide a refuse conveyor system enabling the residents to discharge the refuse on their floor and which is capable of keeping and conveying refuse within a closed container to maintain hygienic conditions.

Other objects and advantages of the present invention will become apparent from the detailed description to follow taken in conjunction with the appended claims.

Therefore, the present invention provides a refuse conveyor system for a multi-floor building, comprising (a) a multi-floor building having a plurality of floors, (b) a vertical shaft defined by walls and extending through one or more floors of said multi-floor building, one of said walls having a window at portions corresponding to the respective floors of said multi-floor building, (c) a transport control system, (d) a refuse container for storing and conveying refuse, said refuse container having a closeable opening and a lid for closing the opening, (e) a compartment having a window on one side thereof and an opening on the top side thereof, said window facing and communicating with said window of said vertical shaft, (f) a weight sensor for checking the fullness of said refuse container with the refuse, (g) transport means for transporting said refuse container, said means being operatively communicated to said transport control system, (h) a conveyor having a conveyor belt operatively communicated with said transport control system, and (i) a tank for storing the refuse, said tank being installed on the ground.

In accordance with the invention, residents of the building can discharge and transport refuse easily and hygienically whenever they want to and they can keep their room clean because the refuses are kept in closed refuse containers placed outside their rooms but on the same floor as that they live on regardless of whether or not it is the predetermined day on which service for gathering or collecting refuse is made by the authority.

DESCRIPTION OF THE PREFERRED EMBODIMENT

Figure 1:
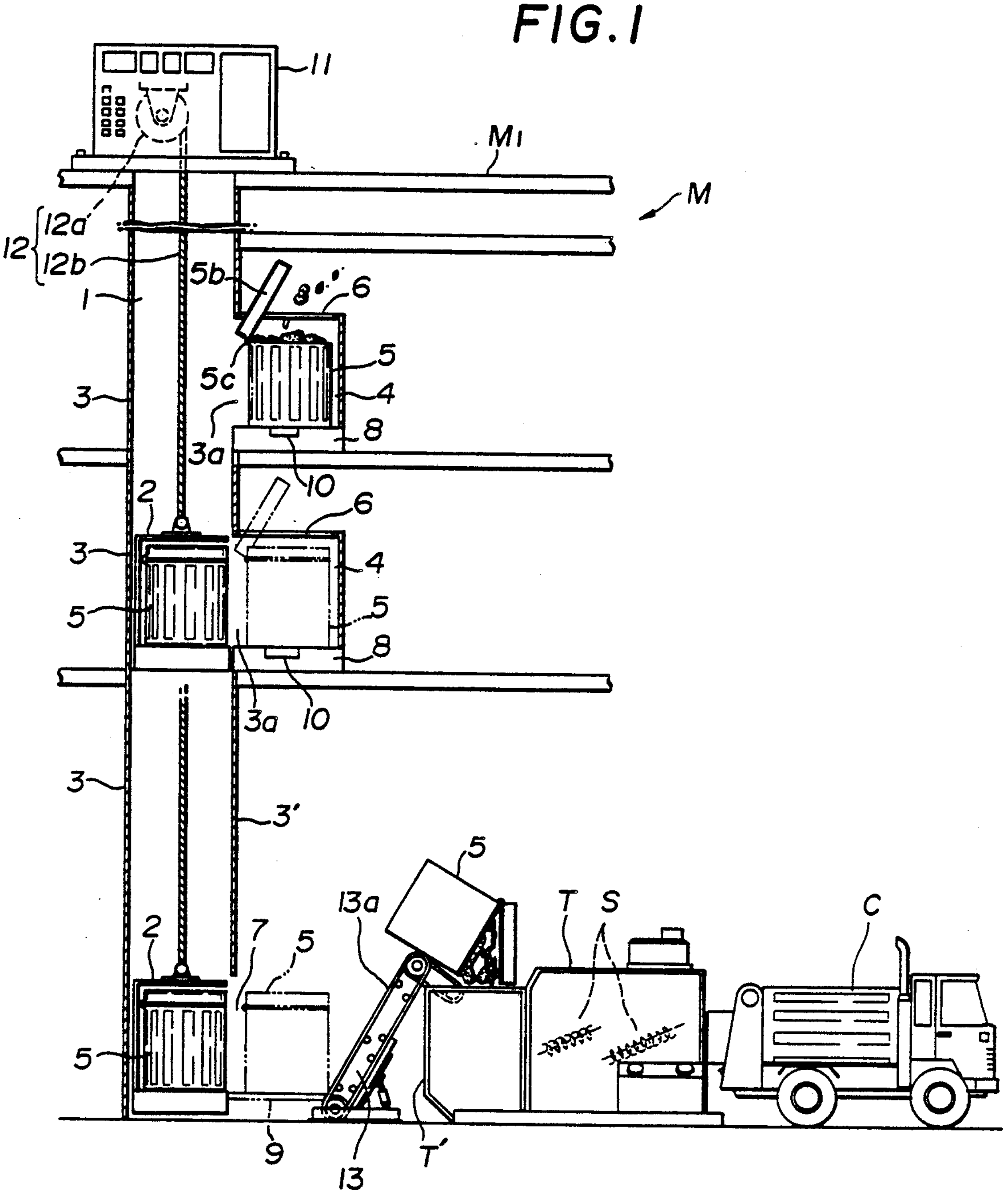
FIG. 1 is an elevational side sectional view of a portion of a building equipped with the refuse conveyor system according to a preferred embodiment of the present invention.

Preferred embodiments of the present invention will be explained hereinafter in greater detail with reference to attached drawings in which identical reference numerals denote similar members or elements.

In FIG. 1, symbol M indicates a medium- or high-rise building such as a multiple dwelling house or the like. The building M has vertical shaft 1 or cavity extending through the first floor to the top floor in which an elevator box 2 can move up and down by appropriate lift means explained later. The shaft 1 is surrounded by side walls 3 installed on each of the floors. One of the walls 3, wall 3', has a window 3*a* generally of a square shape on each floor. Except for the first floor, there are provided compartments 4 on the respective floors. The compartments 4 are connected to the shaft 1. That is, one side of the compartment 4 is open and this open side faces the window 3*a*. The refuse containers 5 are usually placed in the inside of the compartments 4. The compartments 4 have openings 6 through which refuse can be thrown into the refuse containers 5. Also, an exit 7 of the vertical shaft 1 is provided on the first floor where the refuse container 5 full of refuse is unloaded from the elevator box 2.

Figure 2:
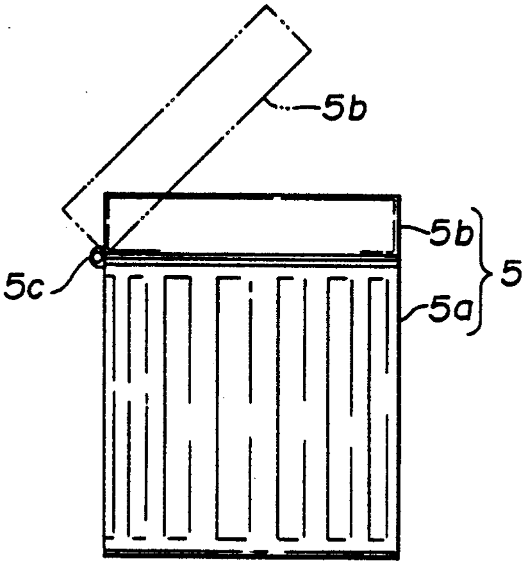
FIG. 2 is an elevational side view of a refuse container to be installed in the refuse conveyor system according to the preferred embodiment shown in FIG. 1.

As shown in FIG. 2, the refuse container is composed of a cylindrical box **5*a* with an upward opening (a bucket) and hatch 5*b* moveably fixed with a hinge 5*c*. The refuse container 5 is mounted on a base 8 so that the a hinge 5*c* is faced to the vertical shaft 1. The hinged hatch 5*b* serves as a lid for closing the opening of the cylindrical box 5*a*. The hinged hatch 5*b* has a predetermined weight enough to tightly close the opening of the cylindrical box 5*a*** by its weight.

Figure 3:
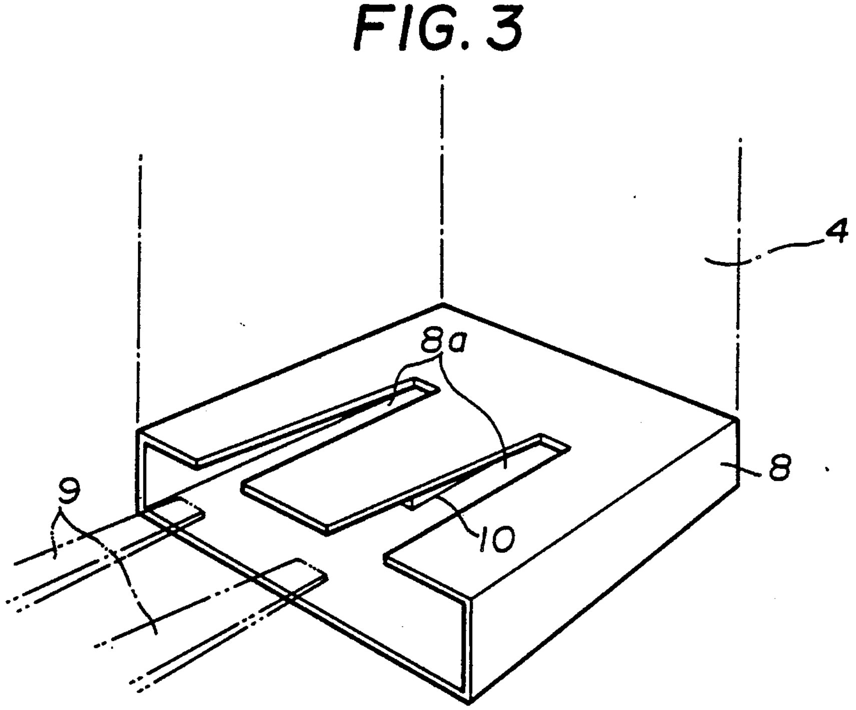
FIG. 3 is an perspective view of a base for mounting the refuse container shown in FIG. 2.
Figure 4:
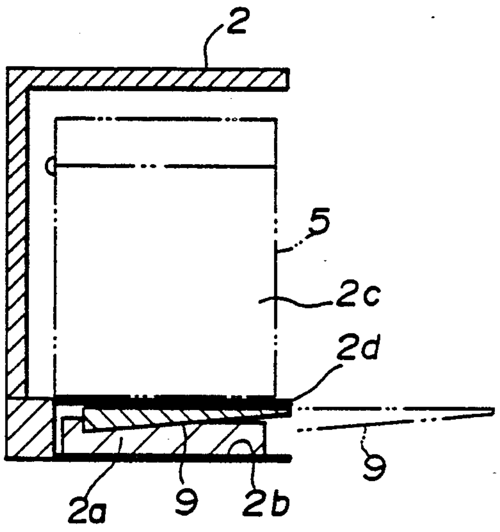
FIG. 4 is an elevational side section of an elevator box for transporting the refuse container shown in FIG. 2.

As shown in FIG. 3, the base 8 is in the form of hollow box. One side thereof is open and the base 8 is placed in the compartment so that its open side or end faces the window **3*a* of the wall 3'. The base has cutout portions or slots 8*a* at an upper side thereof. The slots 8*a* allow the prongs of a fork 9 provided with the elevator box 2 and actuated by appropriate drive means to pass from within the cavity of the base to above the top of the base 8 so that the refuse container 5 on the base 8 can be brought up by the fork 9 and then the refuse container 5 is transported by the fork 9 between the elevator box 2 and the compartment 4 in reciprocal manner by the movement of the fork 9. The elevator box 2 has a member 2*d* which divides the elevator box 2 into two boxes, an upper box and a lower box with openings 2*b* and 2*c*, respectively (see FIG. 4). The member 2*d* has two slots where the fork 9 passes from within the lower box to upper box. Thus, the refuse container is mounted on the member 2*d* by up and down movement of fork 9 in the openings 2*b* and 2*c*. The movement of fork 9 is accomplished by an appropriate drive means 2*a*, for example, hydraulic means, for moving the fork 9 back and forth and/or up and down. With the movement of fork 9, the container is moved similarly. The base 8 also has a weight sensor 10 attached to the inside of the base to detect the refuse container 5 is full of refuse or not. That is, when the weight of the refuse container 5 has attained at a predetermined level by filling with refuse, the weight sensor 10 sends a signal to a transport control system 11 generally located on the top of the shaft 1 to operate the system to work the conveyor system comprising a winding mechanism indicated by reference numeral 12, which is responsible to the reciprocating motion of the elevator box 2 along the vertical shaft 1**.

The elevator box 2 having a window is installed in the vertical shaft 1, and transports the refuse container 5 along the vertical shaft 1 by moving up and down. The window **3*a* which faces to the compartment 4 is as a portal for loading or unloading the refuse container 5 on the base 8**.

Reference numeral 13 indicates a conveyor installed in front of the exit of the vertical shaft 1 at the first floor. The conveyor 13 has a conveyor belt **13*a* which conveys the refuse container 5** from the exit to a refuse tank referenced by symbol T.

Working of the prescribed installations is controlled by the transport control system 11.

Operation of the transport control system 11 is started by the signal from the weight sensor 10 installed in the base 8 which belongs to a compartment 4 at a certain floor. The transport control system 11 operates the winding mechanism 12 to move the elevator box 2 up and down.

The winding mechanism 12 comprises a driving means such as a winch **12*a* which is installed on the top of the building M, and a wire rope 12*b* from which hangs the elevator box 2. The reciprocating motion of the elevator box 2 corresponds to winding or rewinding of the wire rope 12*b* by the winch 12*a* which is controlled by the transport control system 11. The elevator box 2 moves up and down to a corresponding location where the signal was generated by the weight sensor 10**.

Following the above steps, the refuse container 5 filled with refuse is loaded into the elevator box 2 by the fork 9 which is usually housed in the bottom of the elevator box 2 and its horizontal long axis are directed to the window.

That is, the fork 9 moves forth to the compartment along the direction mentioned above and is inserted into the cavity of the base 8 placed in the compartment 4. After the insertion, the fork 9 moves up slightly and passes through the slots **8*a* to lift the refuse container 5. After the lifting, the fork 9 moves back to the elevator box 2, and move down slightly to set the refuse container 5 on the member 2*b* of the elevator box 2. Then, the elevator box 2 loads the refuse container 5** and moves down along the vertical shaft to the first floor in the building M.

The refuse container 5 is backed to the compartment 4 when the steps described above are performed in the reverse order.

The refuse accumulation area is located on the first floor. Thus the elevator box 2 with the refuse container 5 moves down to the first floor by the winding mechanism 12 and unloads the refuse container 5 from the elevator box 2 to the refuse accumulation area (FIG. 1). That is, the fork 9 lifts the refuse container 5 and transports it from the exit of the vertical shaft 1 to a conveyor 13 having a conveyor belt **13*a* which is equipped with means for fixing the refuse container 5 (not shown). The refuse container 5 is set on the conveyor 13 by the folk 9 and is fixed on the belt 13*a*. After the fixing, the conveyor 13 begins to move the belt 13*a* and the fixed refuse container 5 moves up to over the refuse tank T until the opening of refuse container 5 faces to the opening of trash chute T', where the conveyor belt 13*a*** stops moving for a while for throwing refuse into the refuse tank T via trash chute T'.

The refuse accumulated in the refuse tank T is mounted on a refuse cart C by screw conveyors S.

After the throwing, the refuse container 5 emptyed again and the conveyor belt **13*a* starts to move again in reverse order. So, the empty refuse container 5 can be moved back to the place where the fork 9 is located, and then the empty refuse container 5 is put on the fork 9. The fork 9 having the empty refuse container 5 moves back into the elevator box 2 and the empty refuse container 5 is loaded again on the elevator box 2. The elevator box 2 moves up to the compartment 4 where the empty refuse container 5 belonged and the empty refuse container 5 is installed on the base 8 in the compartment 4 by the fork 9**.

According to the preferred embodiment of the invention, the refuse conveyor system transports the refuse from each floor to the accumulation area automatically. Accordingly, the users can discard trash at whichever floors are most convenient. Additionally, offensive odors are avoided because the refuse container has a hinged hatch which closes the opening of the refuse container tightly. Further, it is possible to discard the refuse away from each floor when the refuse container becomes full.

Obviously, numerous modifications and variations of the present invention are possible in light of the above teachings. It is therefore to be understood that within the scope of the appended claims, the invention may be practiced otherwise than as specifically described herein.

What is claimed is:

1. A refuse conveyor system for a multi-floor building, comprising:
(a) a vertical shaft passing through a plurality of floors of the multi-floor building and having walls, one of the walls of the shaft having a window at portions corresponding to the respective floors of said multi-floor building,
(b) a compartment having a window on one side thereof and an opening on the top side thereof, said window facing and communicating with said window of said vertical shaft,
(c) a refuse container for storing and conveying refuse, said refuse container having an opening and a lid for closing the opening,
(d) a weight sensor for checking the fullness of said refuse container,
(e) transport means for transporting said refuse container, along the vertical shaft,
(f) a tank for storing the refuse, said tank being installed on the ground,
(g) a conveyor having a conveyor belt for transporting the refuse container from the transport means to the tank, and
(h) a transport control system for controlling movement of the transport means and the conveyor according to a signal generated from the weight sensor to transport the refuse containers from each floor to and from the tank in a reciprocating manner wherein said transport means comprises an elevator box which has a separator which divides an inner cavity of said elevator box into an upper chamber for loading said refuse container and a lower room for housing a fork.

2. A refuse conveyor system as claimed in claim 1, wherein said elevator box has a window on one side thereof, said elevator box including means for loading therein said refuse container, a wire cable connected to said elevator box and suspending said elevator box, and a winding mechanism for winding and rewinding said wire rope under control of the transport controlling system.

3. A refuse conveyor system as claimed in claim 1, which comprises drive means for driving said fork, said drive means being operable in response to said transport system.

4. A refuse conveyor system for a multi-floor building, comprising:
(a) a vertical shaft passing through a plurality of floors of the multi-floor building and having walls, one of the walls of the shaft having a window at portions corresponding to the respective floors of said multi-floor building,
(b) a compartment having a window on one side thereof and an opening on the top side thereof, said window facing and communicating with said window and said vertical shaft,
(c) a refuse container for storing and conveying refuse, said refuse container having an opening and a lid closing the opening,
(d) a weight sensor for checking the fullness of said refuse container,
(e) transport means for transporting said refuse container, along the vertical shaft,
(f) a tank for storing the refuse, said tank being installed on the ground,
(g) a conveyor having a conveyor belt for transporting the refuse container from the transport means to the tank, and
(h) a transport control system for controlling movement of the transport means and the conveyor according to a signal generated from the weight sensor to transport the refuse containers from each floor to and from the tank in a reciprocating manner wherein said compartment has a base on the bottom thereof, said base being in the form of a hollow box having a cavity for introducing therein a fork equipped in said elevator box, said base having a cutout portion on the top end thereof for passing said fork therethrough.

5. A refuse conveyor system as claimed in claim 4, wherein said base is equipped with said weight sensor for checking the weight of the refuse container which produces and sends a signal to said transport control system when the weight of said refuse container exceeds a predetermined level.

* * * * *